No. 687,744. Patented Dec. 3, 1901.
C. R. GREUTER.
RUNNING GEAR FOR MOTOR VEHICLES.
(Application filed Feb. 15, 1900.)
(No Model.) 4 Sheets—Sheet 1.

Witnesses
J. B. Malnati
O. E. Jenkins

Inventor:
Charles R. Greuter,
by Dodge and Sons,
Attorneys

No. 687,744. Patented Dec. 3, 1901.
C. R. GREUTER.
RUNNING GEAR FOR MOTOR VEHICLES.
(Application filed Feb. 15, 1900.)
(No Model.) 4 Sheets—Sheet 2.

Witnesses
J. C. Jenkins
J. B. Malvati

Inventor
Charles R. Greuter,
by Dodge and Sons,
Attorneys.

THE NORRIS PETERS CO., PHOTO-LITHO., WASHINGTON, D. C.

No. 687,744. Patented Dec. 3, 1901.
C. R. GREUTER.
RUNNING GEAR FOR MOTOR VEHICLES.
(Application filed Feb. 15, 1900.)

(No Model.) 4 Sheets—Sheet 3.

Witnesses
Inventor:
Charles R. Greuter,
by Dodge and Sons
Attorneys

No. 687,744. Patented Dec. 3, 1901.
C. R. GREUTER.
RUNNING GEAR FOR MOTOR VEHICLES.
(Application filed Feb. 15, 1900.)
(No Model.) 4 Sheets—Sheet 4.

Witnesses
Inventor:
Charles R. Greuter,
by Dodge and Sons
Attorneys

UNITED STATES PATENT OFFICE.

CHARLES R. GREUTER, OF HOLYOKE, MASSACHUSETTS, ASSIGNOR TO THE HOLYOKE AUTOMOBILE COMPANY, OF JERSEY CITY, NEW JERSEY, A CORPORATION OF NEW JERSEY.

RUNNING-GEAR FOR MOTOR-VEHICLES.

SPECIFICATION forming part of Letters Patent No. 687,744, dated December 3, 1901.

Application filed February 15, 1900. Serial No. 5,356. (No model.)

*To all whom it may concern:*

Be it known that I, CHARLES R. GREUTER, a citizen of the United States, residing at Holyoke, in the county of Hampden and State of Massachusetts, have invented certain new and useful Improvements in Running-Gear for Motor-Vehicles, of which the following is a specification.

My invention pertains to that class of wheeled vehicles commonly known as "automobiles," which term is here used to include all vehicles adapted for ordinary streets and roadways and containing mechanical means of propulsion.

The invention consists in a novel construction of the running-gear of the vehicle and in a peculiar way of mounting the vehicle and the engine or motor upon the running-gear so that each may adapt itself to the jolting incident to travel over rough roads without in any manner interfering with the other or impairing the action of the motor in propelling the vehicle.

Figure 1:
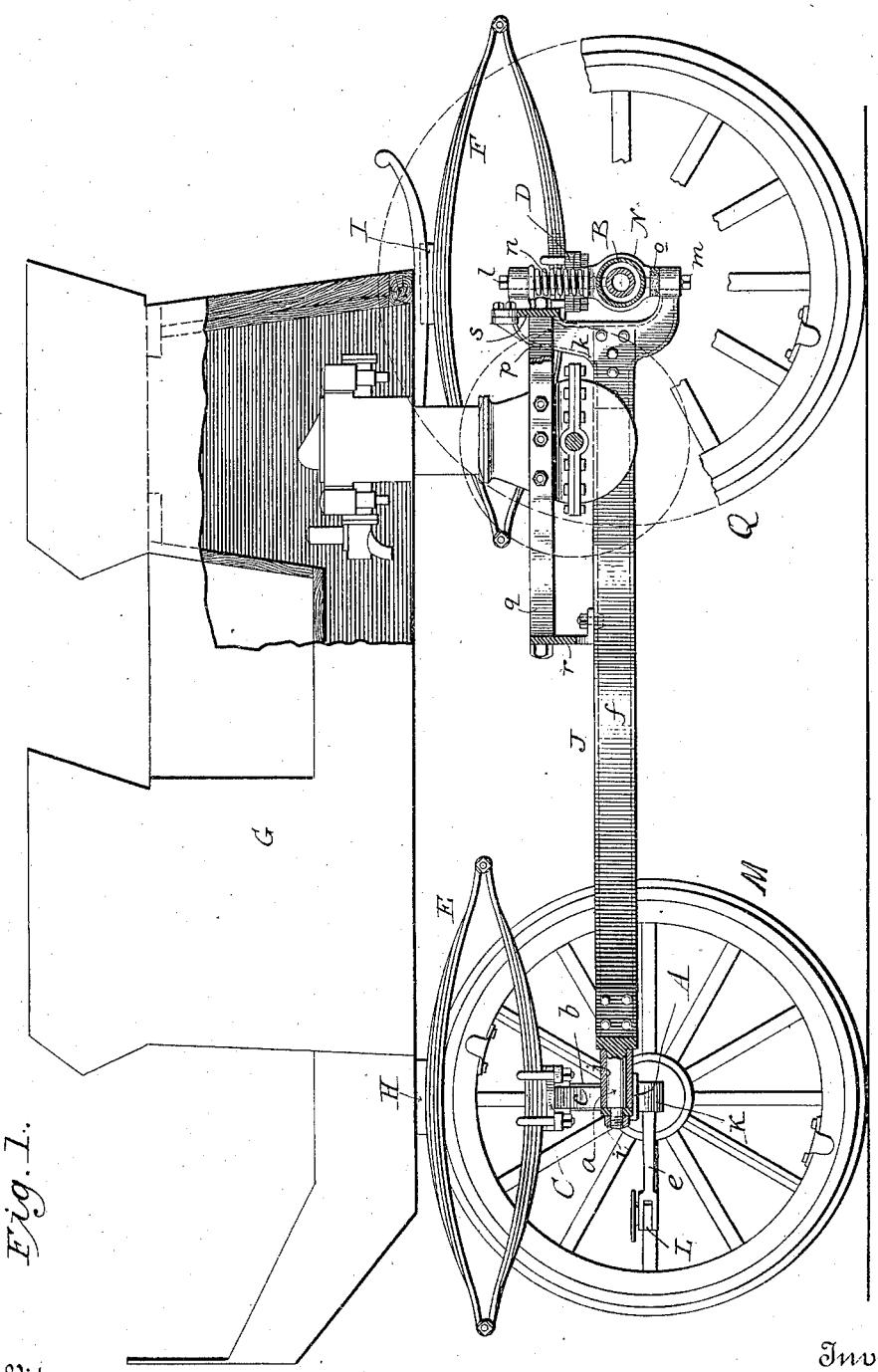
Figure 2:
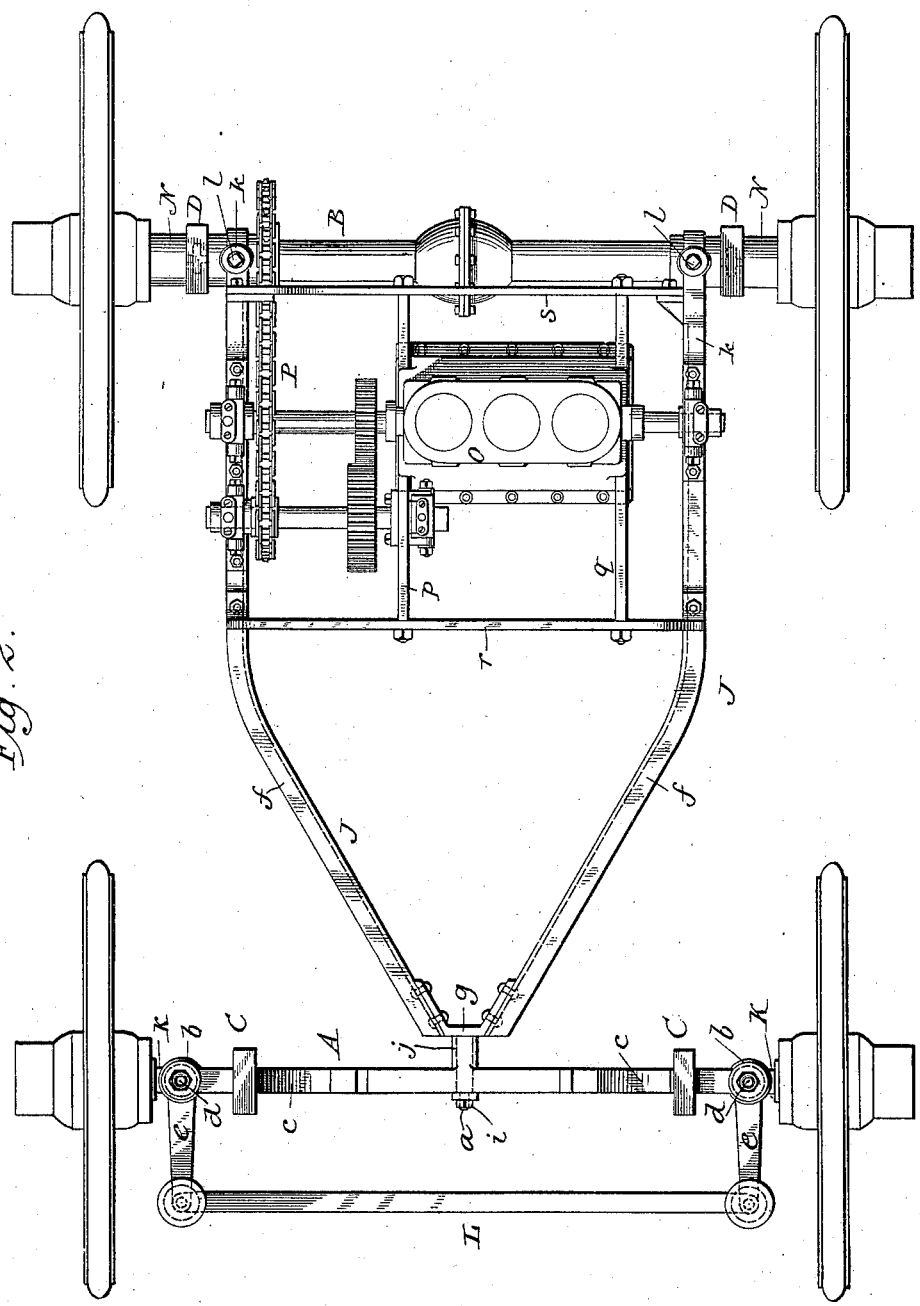
Figure 3:
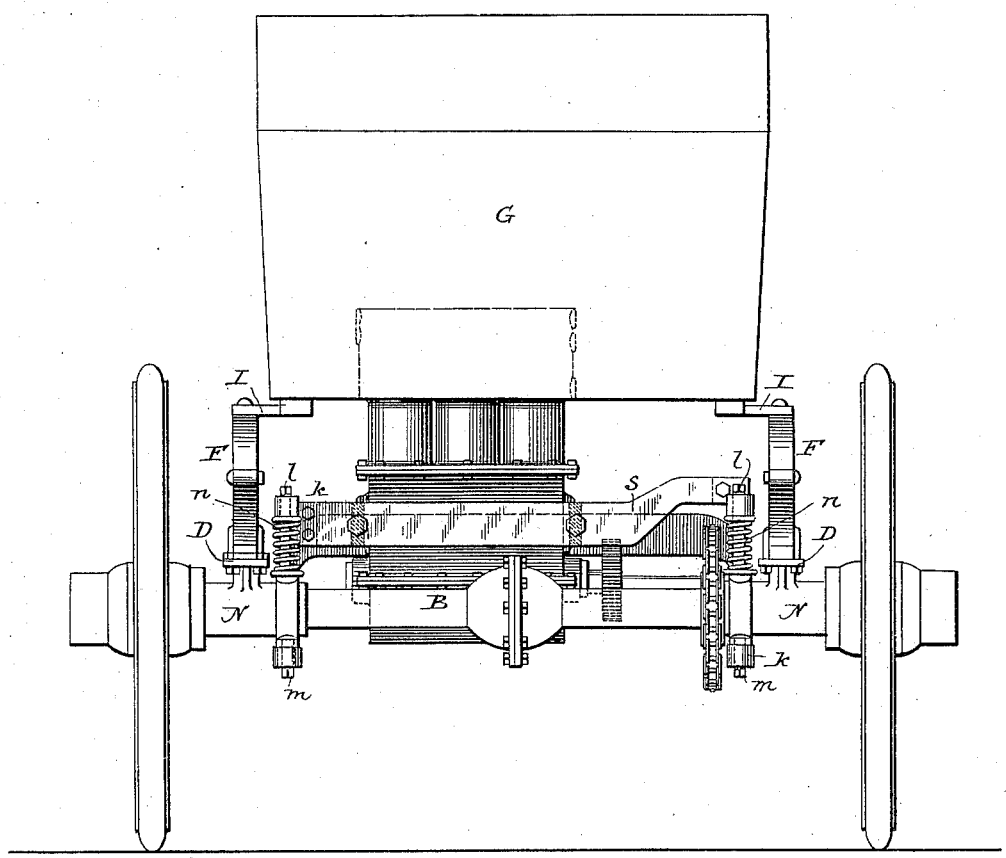
Figure 4:
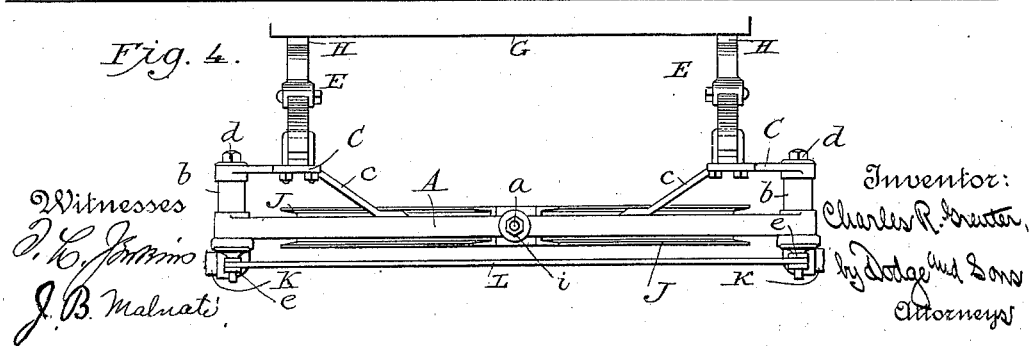
Figure 5:
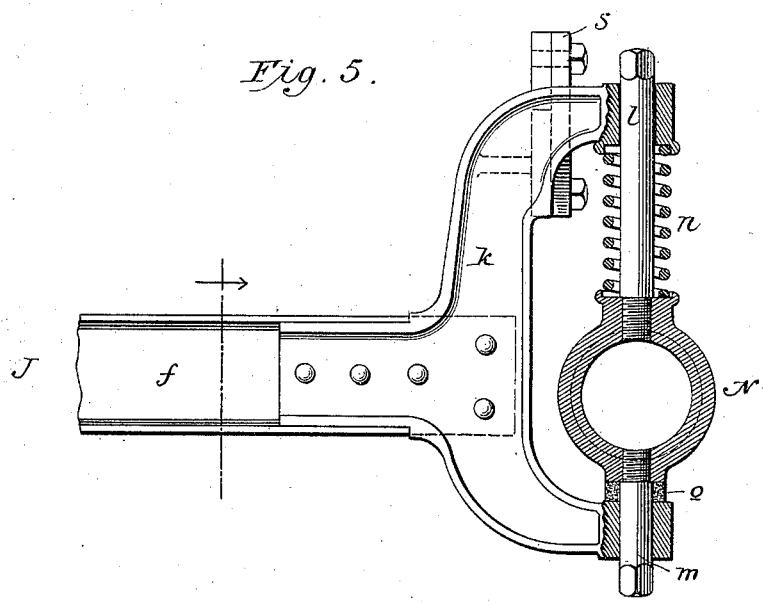
Figure 6:
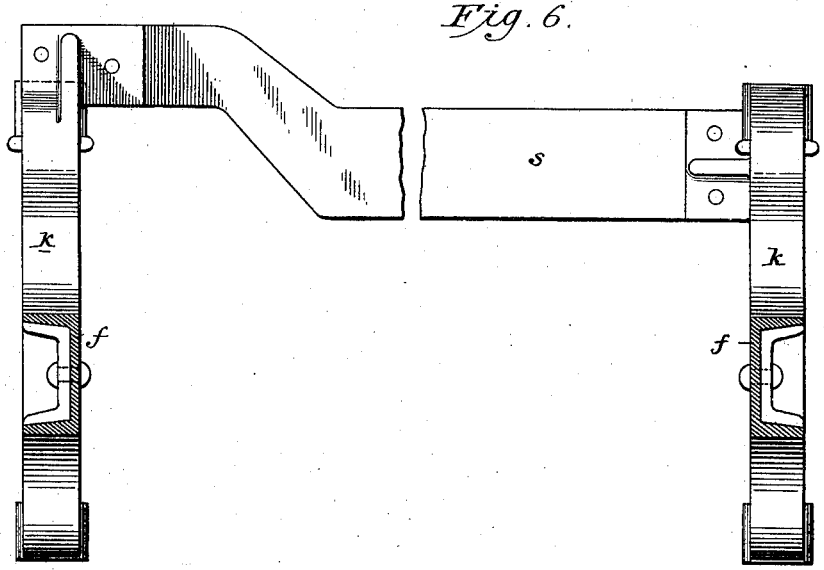

In the accompanying drawings, Figure 1 is a side elevation, partially broken away or in section, of a vehicle embodying my invention. Fig. 2 is a top plan view of the running-gear of said vehicle; Fig. 3, a rear end view; Fig. 4, a front elevation of the forward-axle bar, showing the spring-supports, &c.; Fig. 5, an enlarged view of one of the yokes at the rear of the perch or frame connecting the front and rear axles of the vehicle; Fig. 6, a view of the rear cross-bar or brace of said frame and the yokes attached thereto looking toward the rear of the vehicle, said rear brace or bar being broken away to bring it within the limits of the drawing-sheet.

In the construction of vehicles of this class, particularly such as are designed as pleasure-vehicles, it is desirable that the body or seat carrying portion be mounted on springs capable of yielding readily to any perceptible unevenness in the roadway and of relieving the occupants of any jar or concussion which might otherwise be occasioned in passing over rough places or obstructions. It is also desirable that the motor, whatever be its character, be so supported that it shall not partake of all the motions of the body, nor, in fact, be at all connected with or dependent on the body; but it should, nevertheless, be yieldingly supported, so as to be free from injury by reason of the passage of the vehicle over rough places or obstructions, the elevation of either end or side of the vehicle relatively to the other, or like influences.

To this end the invention consists in the construction represented in the accompanying drawings, wherein—

A indicates a front and B a rear axle of suitable form or character. These axles are provided with somewhat-extended bearing plates or supports C and D, upon which rest and are clamped springs E and F of any suitable type, elliptic springs being represented in the drawings and preferred in practice.

The body G of the vehicle is likewise provided with bearing-plates H and I, which are somewhat extended in the direction of the length of the springs and which rest and are secured thereon, as indicated, the purpose of the elongated bearing-plates being to prevent the springs from being rocked or tipped lengthwise relatively to the body and from thereby permitting the axles to move forward or backward relatively to the body of the vehicle. The same end may of course be attained by suitable bracing or connection between the body of the vehicle and the axles or the springs or between said axles or springs and the perch or connecting-frame.

It is the more general custom in wheeled vehicles, especially those drawn by horses, to connect the forward axle with the perch and forward bolster by a king-bolt and fifth-wheel or, in other words, by a vertical pivot-bolt. Such construction, however, is not well adapted to the purposes of the present invention. Hence I provide an axle-bar A, which is connected by a horizontal pivot-bolt *a* with the perch, reach, or connecting-frame J, interposed between the front and rear axles. This horizontal pivotal connection permits either end of the forward-axle bar to rise or fall independently of the connecting-frame J and similarly permits said frame, and consequently the rear wheels, to rise or fall at either side without affecting the position of the forward axle except as it may slightly rock or turn the axle-spindles in the forward wheels.

Each end of the forward-axle bar is enlarged and fashioned into or provided with a vertical sleeve $b$, as best seen in Fig. 4, the upper ends of said sleeves being braced by flat plates or bars $c$, which latter broaden out at the points where the forward springs E are to be located and are fashioned into the bearing-plates C, above referred to.

Swiveled or journaled in each sleeve $b$ is the upright spindle or stem $d$ of a stud-axle K, which axles are formed each with an arm $e$, extending forward therefrom at a right angle to the axle-spindle, said arms being connected by a cross-bar L. This bar serves to maintain the front wheels M always in parallel planes and to insure their simultaneous and equal movement. This arrangement also permits a quite short turning of the vehicle and relieves the frame J almost entirely of any influence from the rocking or tilting movements of the forward axle due to unequal elevation of the forward wheels.

The rear axle may be of any suitable form and construction, though it is preferred to make it tubular with a view to rendering it as light as is consistent with due strength, and it is preferably made in two sections connected at the middle through the common and well-known "backing-gear," comprising pinions on the respective sections of the shaft and an intermediate connecting-pinion. This backing-gear is not shown in detail in the drawings, since it constitutes no part of the present invention; but the swell or enlargement of the outer member or body of the axle is represented in Figs. 2 and 3.

The means or devices for turning the vehicle or for setting the axle-spindles K to different angles relatively to the length of the vehicle constitute another invention and will be embodied in a separate application, and hence are not here illustrated, a fact which is mentioned merely to account for any seeming incompleteness in the vehicle as a whole.

The perch, reach, or connecting-frame J comprises two side bars $f$, which for about one-half their length are separated and run parallel with each other, but from about their mid-length forward are caused to approach each other toward their forward ends, where they are connected by a V-shaped yoke-piece $g$.

The side bars $f$ are preferably made of channel-iron of the form represented in Figs. 5 and 6, and the yoke or connecting-piece $g$ is formed with diverging arms, which are bolted, riveted, or otherwise secured to the forward ends of the side bars $f$.

Projecting forwardly from the yoke-piece is a pivot stem or spindle $a$, which passes through a tubular neck formed on the axle-bar A and through said bar itself, its protruding end being threaded and provided with a nut $i$ and with a washer or jam-nut, or both. This stem or spindle $a$ is made quite strong and heavy, and the neck $j$ is provided in order to give a long bearing for the axle-bar A, so as to avoid any danger of breakage, bending, or injury to the pivot stem or spindle by reason of the comparatively long leverage of the axle-bar A and the liability of one or the other wheel to encounter obstacles or obstructions in the roadway. Should there be any difficulty experienced from this cause, however, it might readily be counteracted by braces extending from the outer ends of the axle-bar inward to the side bars $f$ of the perch or connecting-frame J and jointed or pivotally connected at its ends to each, the oscillation of the axle-bar A relatively to the frame J, and vice versa, being so slight as to have no material effect in increasing or diminishing the distance between the points of connection. In practice, however, this has been found an unnecessary precaution.

Each side bar $f$ of the perch J is furnished at its rear end with a yoke $k$ of the form shown in Figs. 1 and 5 and which may be forged or cast, as found expedient in any given case. The yokes are riveted, bolted, or otherwise secured to the channel-bars $f$ and are so fashioned as to extend both above and below the rear axle and the shell or casing through which said axle passes, the upper arm of each yoke extending some little distance above said casing, while the lower arm lies closer to the under side.

N indicates a tubular shell or casing, through which passes the rear axle B and which contains within it suitable bearings, preferably of the roller or ball variety, for said rear axle, there being one of said shells or casings N for each end of the axle, each connected with one of the yokes $k$ in the manner illustrated in Fig. 5. Referring to said figure, it will be seen that a guide-stem $l$ rises from the upper side of the shell or casing N and that a similar but shorter stem $m$ extends downward from the under side thereof. The shell or casing is thickened at the points where the stems are attached to give adequate body of metal to receive their threaded ends, and a circular seat or bearing is formed upon the casing N concentric with each of the pins $l$ and $m$, the upper one to receive and support a spiral spring $n$ and the lower one to receive a buffer or washer $o$.

The arms of the yoke $k$ are bored to receive and to fit nicely about the stems $l$ and $m$, whereby said parts are caused accurately to guide each other. The upper arm of the yoke $k$ is formed with a circular seat or bearing for the upper end of the spring $n$ similar to that formed for its lower end in or upon the casing N. The springs $n$ are of such length and power as to fill the space between the upper side of the shell or casing N and the under side of the upper arm of each yoke $k$ and to be under greater or less compression when in such position, so that the lower arm of each yoke shall normally be held in contact with the washer or buffer $o$. The strength of the springs $n$ will also be such as to sustain the weight of the perch or connecting-frame J and all parts carried thereon so far as that weight is liable to be brought upon the rear axle and wheels, with of course a suitable margin of safety to guard against severe jolts or strains.

The engine or motor O, which may be of any common or approved type, is here represented as carried by two bars $p$ and $q$, extending in the direction of travel of the vehicle and carried at their ends by cross-bars or braces $r$ and $s$, the ends of which latter are bolted or otherwise made fast to the side bars $f$ and to the upper arms of the yokes $k$, respectively, as shown in Figs. 1, 2, 3, 5, and 6. As shown in Figs. 3 and 6, the rear brace or cross-bar $s$ has one end raised higher than the other to permit the passage beneath it of a driving chain or band P. (Shown in Figs. 2 and 3.) This raised or arching form is here shown simply as an incident to the use of the chain P with the particular gearing represented; but as the means of connecting the engine or motor with the driven wheel constitutes no part of the present invention and may be varied at will it is to be understood that the form of the brace or bar $s$ may vary with alterations in the form and arrangement of the driving-gear or, in other words, may be fashioned to adapt it to the other features of construction of the vehicle.

Special features of the gearing and of the engine-mounting apart from those herein set forth are purposely excluded from the present description, since they are not a part of the present invention and may be set forth in other applications.

From the foregoing description it will be seen that the body G of the vehicle is free to rise and fall relatively to the ground-wheels M and Q in the same manner and with the same effect as does the body of an ordinary spring-vehicle, and that consequently the occupants will experience the same comfort and the same freedom from jar and concussion incident to travel over rough roads that would be experienced in riding in the ordinary wheeled vehicle. It will also be seen that being carried directly upon the axles and wholly disconnected from and independent of the motor or engine and its supporting-frame said body can be in no manner or degree influenced by any play or movement of the motor. On the other hand, the motor being carried upon a frame wholly independent of the body will not be in any manner or degree affected by the movements of the body and each is free to come and go wholly independent of the other, each having its own springs and its independent range and direction of movement.

Assuming that the vehicle is moving forward and that one of its forward wheels encounters a stone or other elevation in the road or drops into a depression therein, the axle-bar A will be raised or lowered bodily, swinging about the point of bearing of the other forward wheel upon the road-bed. In thus rising or falling the axle-bar will rock or tip slightly about the pivot stem or spindle $a$, thus preventing any twisting or wrenching of the connecting-frame or perch J. This rise or fall and the recovery of normal position may take place so suddenly that the movement will be absorbed by the springs E without any appreciable transmission to the body G of the vehicle, which owing to its inertia can respond but slowly, or there may be a greater or less response or corresponding movement of said body relieved as to its effect by said springs. Similarly if one or the other of the rear wheels meets an elevation or sinks into a depression in the roadway the rear axle will rock or tip and will carry with it the perch or connecting-frame J, turning the stem or pivot-spindle $a$ in the axle-bar A, and thus avoiding any wrenching of said frame. The sudden elevation of either or both wheels of the vehicle either at the front or at the rear thereof and the return thereof to normal plane gives more or less jolt or jar to the frame J and the engine or motor carried thereon, which, if the frame J were rigidly connected to said axles, would subject both the frame and the motor, as also the axles and wheels, to severe and probably dangerous strains. The concussion, jar, or jolt which would be thus occasioned is, however, absorbed by the springs $n$, which yielding permit the rear wheels to rise independently of the frame J and the parts carried thereon or permits said frame and motor to descend independently of and relatively to the rear axles and wheels, the spring in either case restoring the normal condition and relation of the parts.

The provision of separate and distinct spring-supports for the body of the vehicle and for the connecting-frame and its load—the engine or motor, &c.—is the more necessary because of their different weight and inertia, and consequently relatively different time of movement, further affected by the varying load which the body may from time to time receive and carry.

I am aware that it is not broadly new to give to an electric motor a rigid support at one end upon an axle to be driven thereby and a yielding or spring support at the other end, and this I do not intend to claim; but I am not aware that in a vehicle of the nature herein set forth the motor or engine has ever been given a yielding support wholly independent of the body of the vehicle and of such character as to permit all requisite movements of the body, wheels, axles, and perch or connecting-frame without in any manner interfering with the action of the engine or motor or making the movements of the body and the motor in any degree interdependent.

Though the construction set forth and shown is deemed preferable, the common form of forward axle, with king-bolt and turntable or fifth-wheel, may be employed, the horizontal pivot $a$ being in such case carried through the bolster above said axle or located in rear of the king-bolt.

Having thus described my invention, what I claim is—

1. In a motor-vehicle of the class described, the combination of a front-axle bar having horizontally-movable spindles pivotally attached thereto and provided with ground-wheels; a rear axle provided with ground-wheels; bearing-sleeves or shells through which the rear axle passes and in which it turns; a perch or connecting-frame interposed between the front and rear axles and provided at the forward end with a horizontal pivotal connection with the forward-axle bar; yokes carried at the rear end of the connecting-frame; guides projecting from the shells in which the rear axle is journaled and serving to hold and guide the arms of the yokes; and springs interposed between the yokes and the shells and serving to sustain the weight of the yokes, the frame, and the load carried upon said frame.

2. The herein-described running-gear for a motor-vehicle, comprising forward-axle bar A, horizontally-movable spindles K provided with arms $e$ and connecting-bar L; ground-wheels carried by said spindles; rear axle B provided with ground-wheels Q; shells or casings N encircling the axle B and forming bearings in which the latter turns; perch or frame J provided at its forward end with pivot-stem or spindle $a$, connecting it with the forward-axle bar, and at its rear end with yokes $k$; guide-stems $l$ and $m$ projecting upwardly and downwardly from the shells N and encircled by the arms of the yokes $k$; and springs $n$ interposed between the shells N and the upper arms of the yokes.

3. In a motor-vehicle of the character described, the combination of forward-axle bar A provided with horizontally-movable spindles K having arms $e$ projecting therefrom and connected by bar L; ground-wheels M carried by said spindles; rear axle B provided with ground-wheels Q; sleeves or shells N encircling said axle and forming bearings in which the latter may turn; guide-stems $l$ and $m$ projecting upwardly and downwardly from said shells; connecting perch or frame J having at its forward end a horizontal pivotal connection with the forward-axle bar A, and provided at its rear end with yokes $k$, the arms of which pass above and below the shells N and encircle the guide-stems $l$ and $m$; springs $n$ interposed between the yokes $k$ and the shells N; an engine or motor O carried by the frame or perch J; and connections of any suitable character between said engine and the rear axle, whereby motion may be imparted from the former to the latter.

4. In a motor-vehicle such as described, the combination with a wheeled rear axle and a perch or frame supported at its rear end thereby, a forward-axle bar connected with said perch or frame by a horizontal pivot pin or stem, and provided at its ends with vertical sleeves $b$; plates or braces $c$ extending from the axle-bar upward to the upper ends of the sleeves $b$, and serving to brace the same, and formed with spring seats or bearings C; axle-spindles having upright pivot-stems swiveled in the sleeves $b$; springs mounted upon the spring-seats C; springs sustained by the rear axle; and a vehicle-body mounted upon and sustained by the respective springs, substantially as set forth.

5. In a wheeled vehicle, the combination of a front axle; a rear axle; a connecting perch or frame; spring-supports interposed between said frame and the rear axle; a horizontal pivotal connection between said frame and the front axle; springs carried by the front and rear axles; and a body carried by said springs and wholly independent of the connecting frame or perch.

In witness whereof I hereunto set my hand in the presence of two witnesses.

CHARLES R. GREUTER.

Witnesses:
ANDREW H. MATHESON,
ARTHUR E. PHELON.